DE WITT W. BISBEE & P. A. CRESSEY.
EXPANSION RING FOR ELECTRIC MOTORS.
APPLICATION FILED JUNE 14, 1915.
1,208,460.  Patented Dec. 12, 1916.
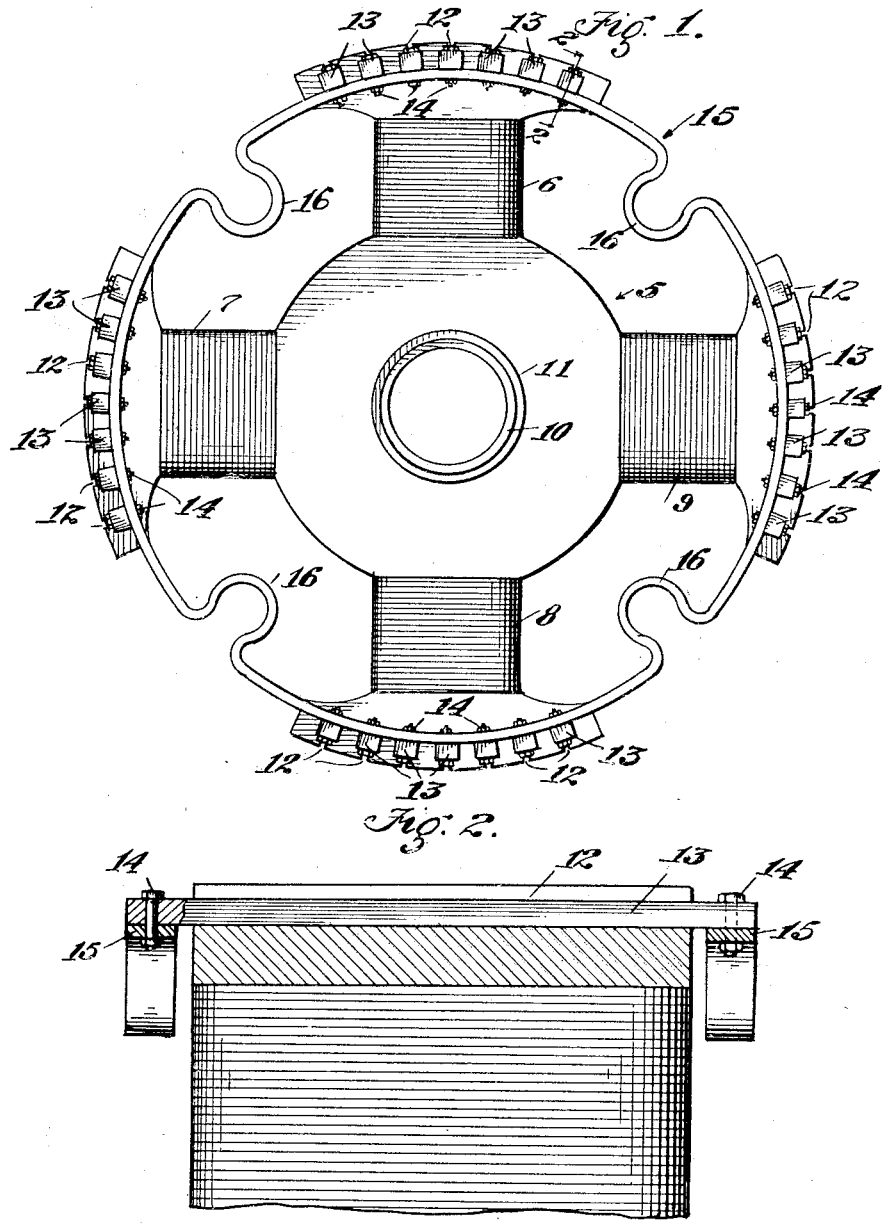

UNITED STATES PATENT OFFICE.

DE WITT W. BISBEE AND PETER AMES CRESSEY, OF NACOZARI, MEXICO.

EXPANSION-RING FOR ELECTRIC MOTORS.

1,208,460.   Specification of Letters Patent.   Patented Dec. 12, 1916.

Application filed June 14, 1915. Serial No. 33,903.

*To all whom it may concern:*

Be it known that we, DE WITT W. BISBEE and PETER AMES CRESSEY, citizens of the United States, residing at Nacozari, Sonora, Mexico, have invented new and useful Improvements in Expansion-Rings for Electric Motors, of which the following is a specification.

This invention relates to synchronous motors and especially to revolving field polyphase synchronous motors provided with a starting device consisting of a squirrel cage induction motor winding. Polyphase synchronous motors are sometimes started by connecting the armature with the alternating current means producing eddy currents in the field poles and thereby creating in effect an induction motor. As the motor reaches approximately synchronous speed, the field poles are connected with the continuous current circuit and the rotor is pulled into synchronism thereafter operating as a synchronous motor.

In order to increase the starting torque, the field poles have been provided with inductor bars extending transverse to the plane of rotation, and end rings have been provided short circuiting the inductor bars. Starting torques substantially equal to thirty per cent. of the full load torque have been produced by such motors. Where a greater starting torque is required, the current which flows in the inductors becomes excessively great, causing excessive heating of the end rings and expansion of the same, which forces the inductor bars across the air gap and into contact with the armature, thereby mutilating the armature and causing a great variety of troubles. Attempts have been made to anchor the inductor bars to prevent their outward movement, but where this is successfully done, the end ring between poles becomes distorted and is forced outward against the armature.

It is an object of our invention to provide a polyphase synchronous motor having a squirrel cage winding for starting with an end ring which is expansible, thereby permitting the motor to be started under a heavy load, without injury to the motor.

We accomplish these objects by means of the embodiment of our invention illustrated in the accompanying drawing, in which:

Figure 1 is an end elevation showing a synchronous motor revolving field rotor equipped with squirrel cage inductor bars and our improved end ring. Fig. 2 is an enlarged section taken on the line 2—2 of Fig. 1.

More specifically, 5 indicates a rotor provided with four field poles 6, 7, 8 and 9 of the usual construction, that is, formed of sheet metal laminations. Upon the field poles are disposed field windings for the continuous current, these windings being connected to the usual collector rings represented diagrammatically as indicated by 10 and 11, the number of field poles being immaterial. Each field pole is provided at its end with channels as indicated by 12, in which are embedded inductor bars 13. Bars 13 are bare at their ends and are secured by means of bolts 14 to copper end rings 15. The end rings are provided at points intermediate the poles with inwardly bent loops 16, thereby providing an expansible section, so that with elongation of the circumference of the end ring, an increase in diameter will not result, as the loops 16 will take care of such expansion.

It has been found that a synchronous motor constructed as above may have a starting torque equal to that of a full load without injury to the rings. The rings may glow with heat, but no damage results, as neither the rings nor inductor bars are forced across the air gap.

What we claim is:

In a revolving field synchronous motor, a rotor provided with field poles, a secondary circuit for rendering the motor self-starting, comprising inductors mounted on said field poles transverse to the plane of rotation of said rotor, and continuous short circuiting end rings of relatively low resistance secured to each of said inductors for short circuiting the same, said end rings having loops intermediate the poles of relatively high flexibility, said loops bent inwardly in the planes of their respective rings.

In witness that we claim the foregoing we have hereunto subscribed our names this 14 day of May, 1915.

DE WITT W. BISBEE.
PETER AMES CRESSEY.

Copies of this patent may be obtained for five cents each, by addressing the "Commissioner of Patents, Washington, D. C."